United States Patent [19]

Cox et al.

[11] 4,106,355

[45] Aug. 15, 1978

[54] RAMP DEVICE TO REDUCE WEAR ON TROJAN BAR DOGS AND WHEEL LUGS IN AN IRRIGATION VALLEY CENTER PIVOT WATER DRIVE

[76] Inventors: Jerry H. Cox, Rte. 1, Box 101; Robert F. Thomas, Rte. 1, Box 66, both of Hugoton, Kans. 67951

[21] Appl. No.: 725,774

[22] Filed: Sep. 23, 1976

[51] Int. Cl.² ............................................. F16H 21/44
[52] U.S. Cl. ..................................... 74/99 A; 239/212
[58] Field of Search ........................ 74/99 A, 567, 56; 239/212

[56] References Cited

U.S. PATENT DOCUMENTS

| 1,508,553 | 9/1924 | Horridge | 74/99 |
| 3,438,271 | 4/1969 | Cain | 74/569 |
| 3,952,952 | 4/1976 | Townsend | 239/212 |
| 4,005,730 | 2/1977 | Townsend | 239/212 |

*Primary Examiner*—Benjamin W. Wyche
*Assistant Examiner*—Wesley S. Ratliff, Jr.
*Attorney, Agent, or Firm*—Edwin H. Crabtree

[57] ABSTRACT

A ramp device used to reduce wear on trojan bar dogs mounted on the ends of a trojan bar and to reduce wear on wheel lugs driven by the dogs. The wheel lugs are attached to wheels used in moving a self-propelled irrigation sprinkler.

6 Claims, 5 Drawing Figures

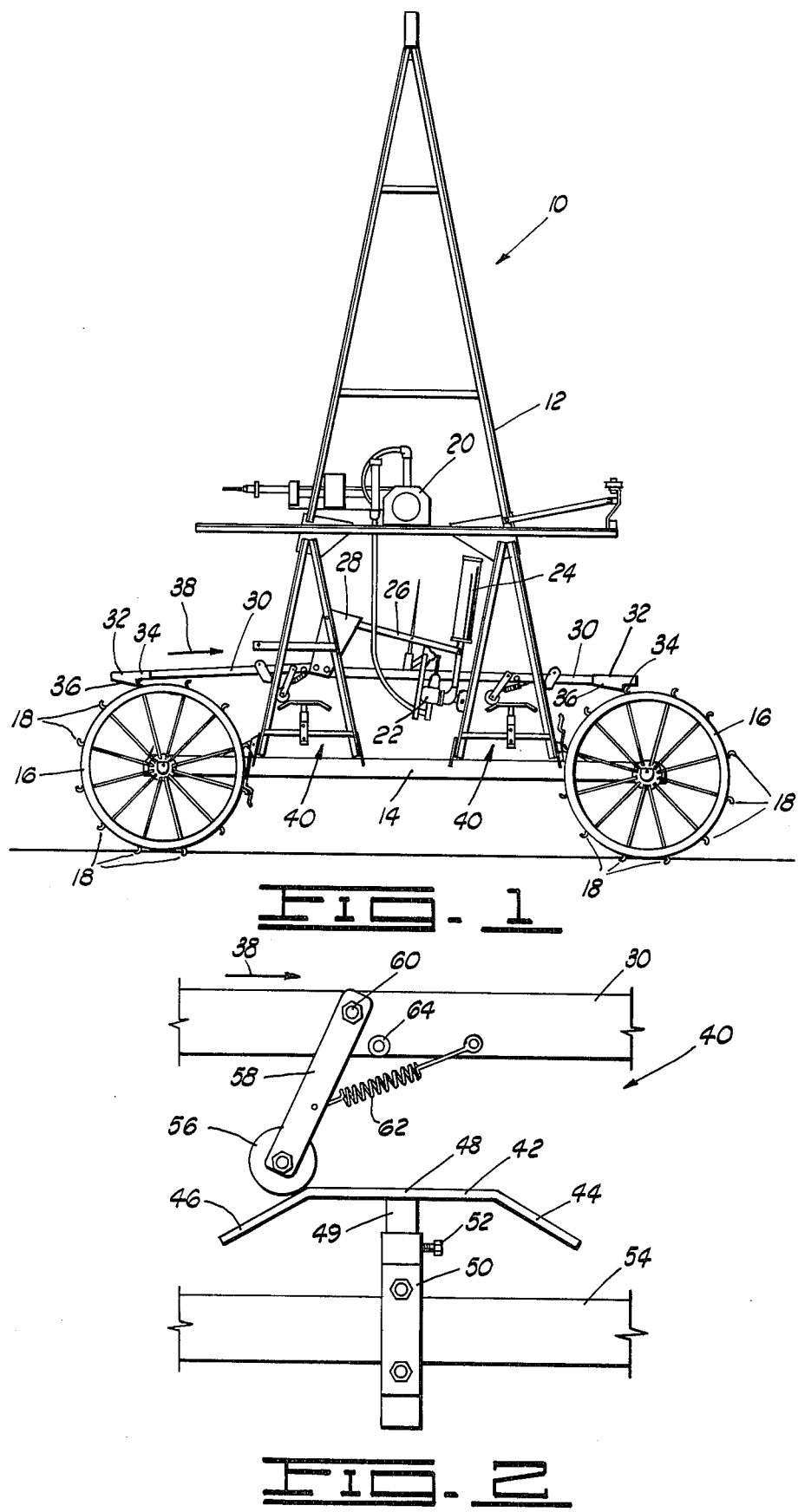

RAMP DEVICE TO REDUCE WEAR ON TROJAN BAR DOGS AND WHEEL LUGS IN AN IRRIGATION VALLEY CENTER PIVOT WATER DRIVE

BACKGROUND OF THE INVENTION

This invention relates generally to a device for mounting on a wheel mounted self-propelled irrigation sprinkler, and more particularly, but not by way of limitation, to a ramp device used in reducing wear on trojan bar dogs and wheel lugs, which are a part of the irrigation sprinkler equipment.

Heretofore, wheel mounted self-propelled irrigation sprinkler systems have been driven by water pressure driving a hydraulic water pump mounted on a tower frame. The hydraulic water pump through mechanical linkage drives a horizontally mounted trojan bar. The bar includes trojan bar dogs mounted at each end thereof. The trojan bar dogs engage wheel lugs which are mounted along the sides of wheels. The wheels support the tower frame and propel the irrigation sprinkler across the ground surface. During the drive stroke of the trojan bar, the trojan bar dogs contact one of the wheel lugs mounted on the wheels and drives the wheels forward until the trojan bar reaches the end of the drive stroke. At this point, the trojan bar starts its return stroke and the trojan bar dog disengages the wheel lugs and move rearwardly riding upwardly and over adjacent wheel lugs until the return stroke is completed. The direction of the trojan bar is reversed and the drive stroke starts again with the trojan bar dog engaging the adjacent wheel lugs and the pattern is repeated.

During the return stroke of the trojan bar, and after the trojan bar dogs have disengaged themselves from the wheel lugs, the trojan bar dogs ride over the adjacent wheel lugs and wear against the top surface of the wheel lugs. This contact between the dogs and wheel lugs causes premature wear of the bottom surface of the dogs and the top surface of the wheel lugs. This wear continues until the dogs and wheel lugs are sufficiently worn so that the dogs no longer engage the wheel lugs during the drive stroke or the dogs bind on the wheel lugs, thereby stopping the travel of the irrigation sprinkler.

The subject invention provides a ramp device used in conjuction with a wheel mounted self-propelled irrigation sprinkler which eliminates trojan bar dog and wheel lug wear.

SUMMARY OF THE INVENTION

The subject invention provides a novel ramp device which during the return stroke of the trojan bar, lifts the trojan bar upwardly, thereby providing clearance between the trojan bar dogs, and the adjacent wheel lugs, thereby eliminating any wear on the top surface of the wheel lugs and the bottom surface of the trojan bar dogs.

The ramp device eliminates costly down time of the irrigation sprinkler system and loss of food crops due to intermittent irrigation. Also, the cost and time required in repairing the irrigation sprinkler due to accelerated wear of the trojan dogs and wheel lugs is eliminated.

The ramp device can be mounted on various types and sizes of irrigation sprinklers, which are driven by trojan bars driving wheel lugs mounted on wheels used in moving the irrigation sprinkler.

The ramp device includes an adjustable ramp slidably mounted in a ramp holder. The ramp holder is attached to a mounting bracket which is secured to the tower frame of the irrigation sprinkler. A roller attached to one end of a roller arm rides on the surface of the adjustable ramp. The roller and roller arm are suspended vertically from the trojan bar and the roller arm is held in place during the return stroke of the trojan bar by a stop attached to the side of the trojan bar. During the return stroke of the trojan bar, the roller arm is pivoted by a spring on the trojan bar against the stop and held against the stop in a vertical position. As the trojan bar moves rearwardly on its return stroke, the roller rides up over the surface of the ramp so that the roller arm lifts the trojan bar, and the trojan bar dogs are lifted above the adjacent wheel lugs thereby preventing contact during the return stroke of the trojan bar dogs and the wheel lugs.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a side view of a wheel mounted self-propelled irrigation sprinkler.

FIG. 2 is an enlarged cut-away side view of the ramp device.

DETAILED DESCRIPTION OF THE DRAWING

Figure 3:
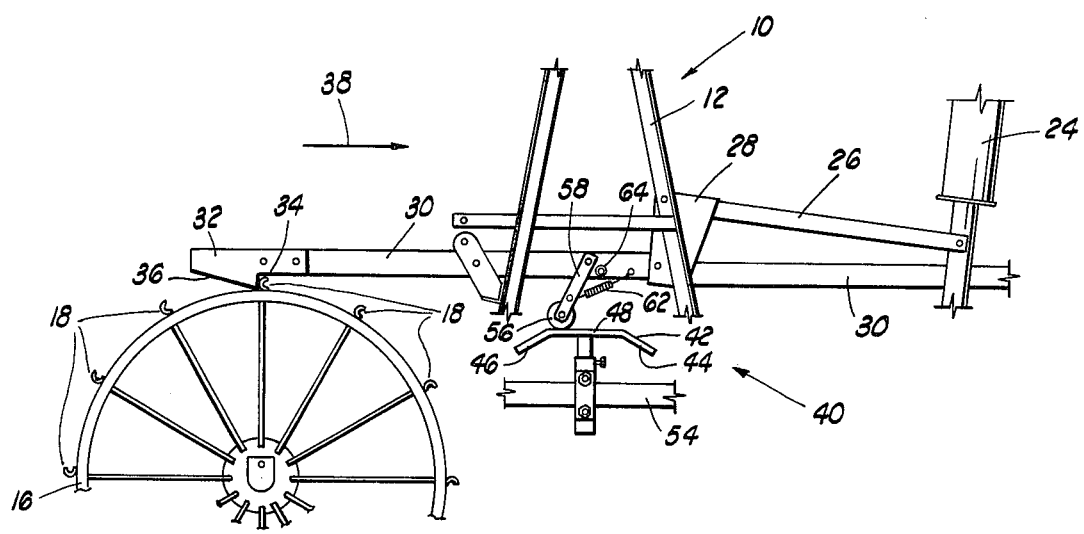
FIG. 3 is a side view of the ramp device with the trojan bar dog contacting the wheel lug during the drive stroke of the trojan bar.

In FIG. 1, the irrigation sprinkler is designated by general reference numeral 10. The sprinkler 10 includes a tower frame 12 mounted on top of a wheel frame 14. Both ends of the wheel frame 14 include rotatably mounted wheels 16. The wheels 16 include wheel lugs 18 extending outwardly from the circumference of the wheels 16, and in an equally spaced relationship to each other. For example, in this illustration, the lugs are spaced approximately 30° apart.

The sprinkler 10 is driven by water pressure supplied from a water pump and delivered through a conduit to a water valve 20 mounted on the frame 12. The water valve 20 supplies water under pressure through a valve assembly 22. The valve assembly 22 distributes the water into a hydraulic water pump 24. The hydraulic water pump 24 when activated, drives an arm 26 attached to a trojan bar pivot 28. The pivot 28 in turn drives a trojan bar 30 back and forth in a horizontal direction.

The trojan bar 30 includes trojan bar dogs 32 mounted at each end thereof. The dogs 32 include a slot 34 at one end thereof for engaging the wheel lugs 18 during the drive stroke. Adjacent the slot 34 and at the opposite end of the dogs 32 is an upwardly angled bearing surface 36. The surface 36 during the return stroke of the trojan bar 30, provides means for lifting the trojan bar dogs 32 above the adjacent wheel lugs 18, prior to engaging the lugs 18 during the drive stroke.

In operation, the sprinkler 10 is driven on the wheels 16 by water pressure driving the hydraulic water pump 24. As the pump 24 is activated up and down, this motion is transferred to the trojan bar pivot 28, which in turn causes the trojan bar 30 to move back and forth in a horizontal direction. The wheels 16 are turned in one direction by the trojan bar dogs 32 engaging one of the wheel lugs 18 attached to the wheel 16. In FIG. 1, the drive stroke of the trojan bar is from left to right and indicated by arrow 38.

During the drive stroke, the slot 34 of the dogs 32 engage a wheel lug 18, at the top of the wheels 16. The wheels 16 are rotated approximately the same distance as the length of the drive stroke. For example, during the start of the drive stroke, the dogs 32 engage the wheel lugs 18 and the trojan bar 30 moves from left to right for a predetermined distance. At the same time, the wheels 16 are moved clockwise, and rotate approximately 30°.

As the return stroke of the trojan bar 30 begins, the slot 34 in the dogs 32 is disengaged from the wheel lugs 18. At this point, the adjacent wheel lugs 18 counter-clockwise from the engaged wheel lugs 18 have moved to the top position on the wheels 16. To prevent the dogs 32 from engaging the adjacent wheel lugs 18 and reversing the direction of the wheels 16, the upwardly angled bearing surface 36 of the dogs 32 ride over the top of the adjacent lugs 18, thereby moving the dogs 32 and trojan bar 30 upwardly and over the lugs 18. When the return stroke is completed, the dogs 32 again move forward from left to right and the slots 34 engage the adjacent lugs 18 and the forward movement of the wheels 16 is continued.

The contact of the bearing surface 36 of the dogs 32 against the top surface of the adjacent lugs 18, causes accelerated wear of both the dogs 32 and the lugs 18, as previously discussed. This wear is eliminated by the ramp device designated by general reference numeral 40, and illustrated in FIG. 2.

In FIG. 2, the ramp device 40 includes an adjustable ramp 42 having an angled surface 44 and 46 at the ends of a horizontal surface 48. The ramp 42 includes a ramp arm 49 slidably mounted and extending downwardly in a ramp holder 50, and secured thereto by an adjustable bolt 52. The holder 50 is secured to a horizontal mounting bracket 54, which is attached to the tower frame 12.

Coacting with the ramp 42, is a roller 56 rotatably mounted on one end of a roller arm 58. The other end of the roller arm 58 is pivotly attached to the trojan bar 30 by a bolt and nut 60. The roller arm 58 is biased in a counter-clockwise direction by a spring 62 having one end attached to the trojan bar 30 and the other end attached to the arm 58.

As the arm 58 is pivoted in a counter-clockwise direction, the side of the arm 58 contacts a stop 64, which holds the arm 58 in place in a vertical position.

During the operation of the sprinkler 10, the trojan bar 30 begins its drive stroke from left to right as indicated by arrow 38 and the roller arm 58 is biased against the stop 64 by the spring 62. As the trojan bar 30 moves above and adjacent the ramp device 40, the roller 56 contacts the angled surface 46 of the ramp 42 and the force of the spring 62 is over come and the roller arm 58 pivots in a clockwise direction allowing the roller 56 to ride up and across the ramp 42 without lifting the trojan bar 30 and trojan bar dogs 32.

When the drive stroke has been completed, the roller 56 and roller arm 58, while not shown in the drawings, are positioned to the right of the ramp 42. As the return stroke begins from right to left and indicated by arrow 66 in FIG. 4, the spring again biases the roller 56 into a vertical position against the stop 64. As the roller 56 contacts the angled surface 44 of the ramp 42, the roller arm 58 is held in place against the stop 64 and the arm 58 urges the trojan bar 30 upward as the roller 56 rolls up the angled surface 44. As the trojan bar 30 moves upwardly, in turn, the trojan bar dogs 32 move upwardly, thereby clearing the top of the wheeled lug 18 shown at the top of the wheel 18 in FIG. 4.

The roller 56 proceeds along the horizontal surface 48 of the ramp 42 until is moves downward on angled surface 46 and lowers the trojan bar 30 and trojan bar dogs 32 prior to the completion of the return stroke. When the return stroke is completed, the direction of the trojan bar 30 is reversed and the drive stroke is repeated.

As mentioned above, FIG. 3 illustrates one end of the trojan bar 30, with the trojan bar dog 32 engaging a wheel lug 18 during the drive stroke of the trojan bar 30.

Figure 4:
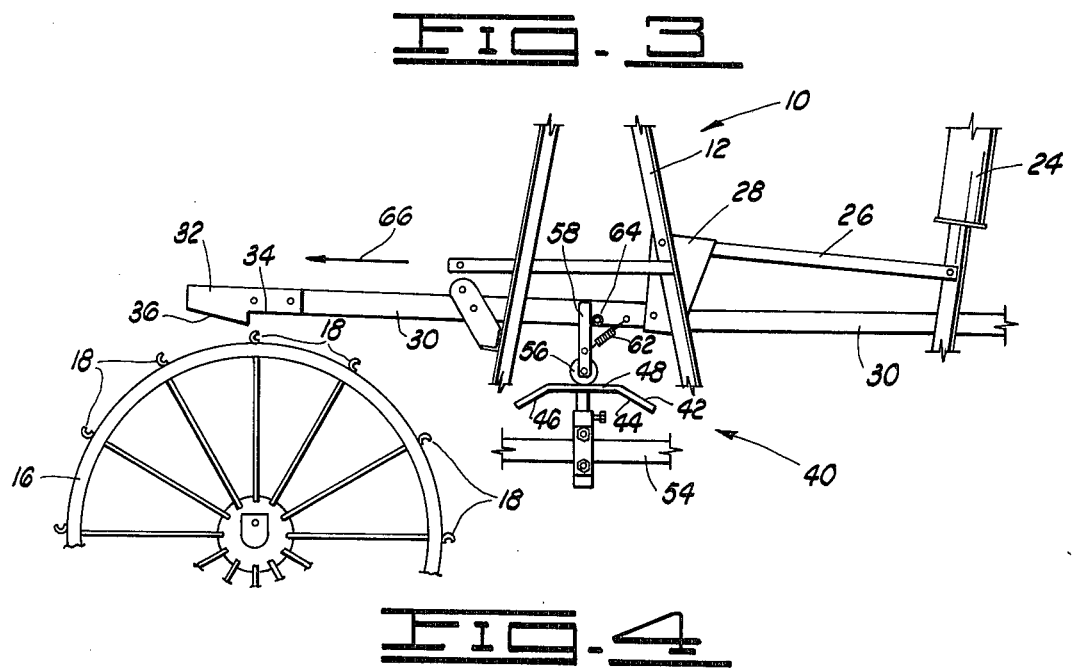
FIG. 4 is a side view of the ramp device with the trojan bar dog disengaged from the wheel lug during the return stroke of the trojan bar.

FIG. 4 illustrates one end of the trojan bar 30 with the trojan bar 32 disengaged from the wheel lug 18 during the return stroke of the trojan bar 30.

Figure 5:
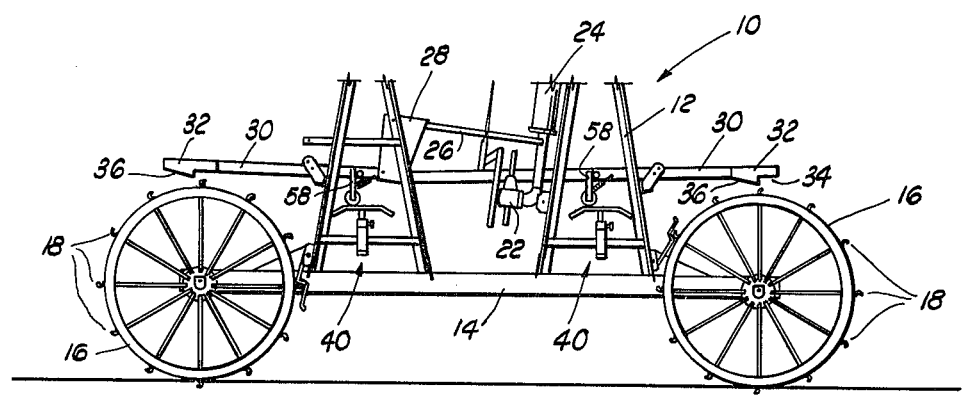
FIG. 5 illustrates the lower portion of the sprinkler with the ramp device lifting the entire trojan bar during the return stroke of the trojan bar.

FIG. 5 illustrates the entire trojan bar 30 with both trojan bar dogs 32 disengaged from the wheel lugs 18 during the return stroke of the trojan bar 30. In this illustration, the roller arms 58 are held in place in a vertical position and the ramp device 40 has raised the dogs 32 so that they are prevented from contacting the top surface of the wheel lugs 18 during the return stroke.

Changes may be made in the construction and arrangement of the parts or elements of the embodiment as disclosed herein without departing from the spirit or scope of the invention as defined in the following claims.

I claim:

1. A ramp device used to reduce wear on trojan bar dogs mounted on the ends of a trojan bar and reduce wear on wheel lugs driven by the dogs, the ramp device used in conjunction with a wheel mounted self-propelled irrigation sprinkler, the trojan bar dogs engaging the wheel lugs for driving the sprinkler wheels during the drive stroke of the trojan bar, the trojan bar dogs riding over the top of adjacent wheel lugs during the return stroke of the trojan bars, the ramp device comprising:

ramp means for raising the trojan bar, said ramp means attached to a tower frame of the sprinkler, said ramp means disposed adjacent to the trojan bar; and a roller mounted on one end of a roller arm, the other end of said roller arm pivotly mounted on the trojan bar, said roller arm held in a vertical position by a stop secured to the trojan bar during the return stroke of the trojan bar so that said roller when contacting the surface of said ramp means raises the trojan bar; and a spring attached to said roller arm and the trojan bar for biasing said roller arm against said stop.

2. The device as described in claim 1, wherein said ramp means includes an adjustable ramp slidably mounted in a ramp holder, said ramp holder attached to a mounting bracket which is secured to the tower frame.

3. A ramp device used to reduce wear on trojan bar dogs mounted on the ends of a trojan bar and reduce wear on wheel lugs driven by the dogs, the ramp device used in conjunction with a wheel mounted self-propelled irrigation sprinkler, the trojan bar dogs engaging the wheel lugs for driving the sprinkler wheels during the drive stroke of the trojan bar, the trojan bar dogs riding over the top of adjacent wheel lugs during the return stroke of the trojan bar, the ramp device comprising:

a ramp attached to a tower frame of the sprinkler, said ramp disposed adjacent the trojan bar;

a roller attached to one end of a roller arm, the other end of said roller arm attached to the trojan bar, said roller contacting the surface of said ramp during the drive stroke and return stroke of the trojan bar, said roller arm held in a vertical position against a stop attached to the trojan bar during the return stroke of the trojan bar; and a spring, one end of said spring attached to said roller arm, the other end of said spring attached to the trojan bar, said spring biasing said roller arm in a vertical position and against said stop during the return stroke of the trojan bar.

4. The device as described in claim 3, wherein said roller arm pivots on said trojan bar and away from said stop during the drive stroke of the trojan bar.

5. The device as described in claim 3, wherein said ramp includes a horizontal bearing surface and downwardly angled bearing surfaces at the ends of said horizontal bearing surface, said ramp raising and lowering the trojan bar when said roller rides thereon during the return stroke of the trojan bar.

6. The device as described in claim 3, wherein said ramp includes a ramp arm attached thereto and extending downwardly therefrom, said ramp arm slidably mounted in a ramp holder, said ramp holder attached to a mounting bracket secured to the tower frame, said ramp arm by slidably adjusting in said ramp holder raises and lowers said ramp, thereby adjusting the heighth the trojan bar is raised during the return stroke of the trojan bar.

* * * * *